Aug. 14, 1951     H. D. EAST     2,563,995
COLLAPSIBLE WAGON

Filed April 10, 1950     2 Sheets-Sheet 1

Howard D. East
*INVENTOR.*

BY *Clarence A. O'Brien
and Harvey B. Jackson*
          *Attorneys*

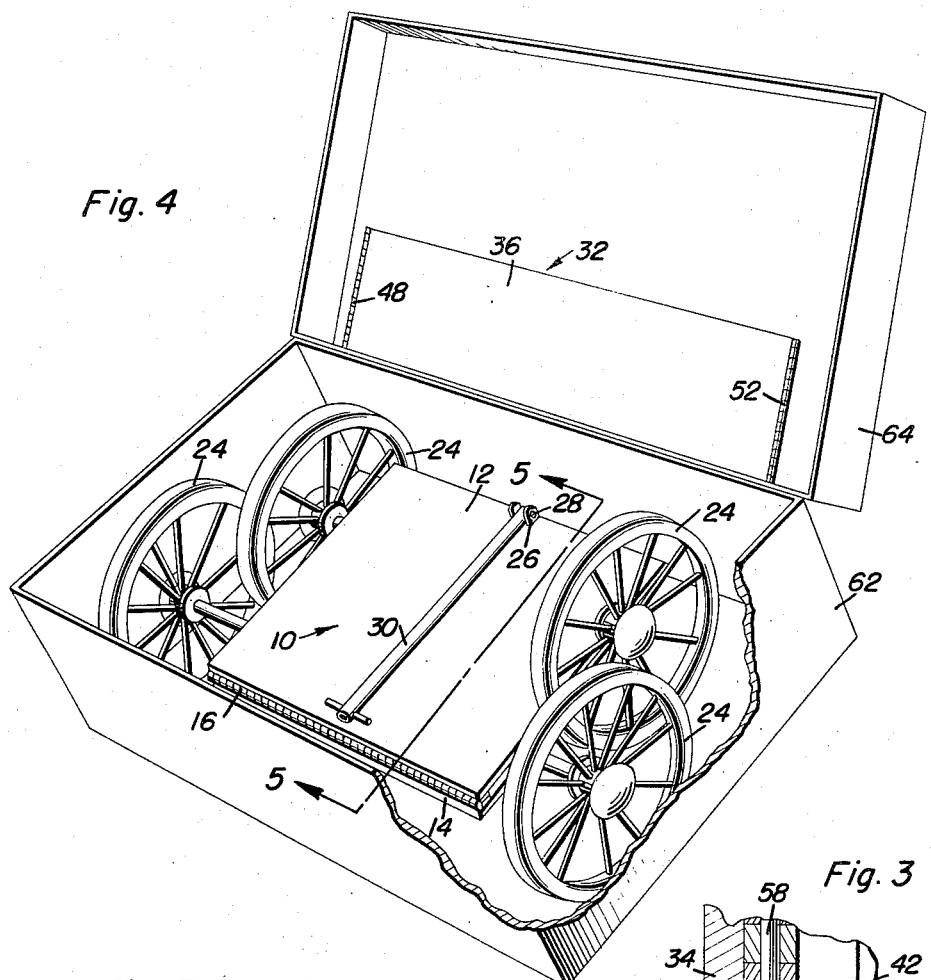
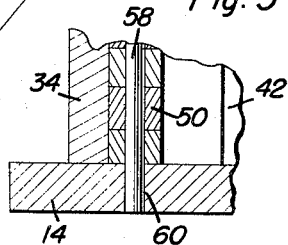
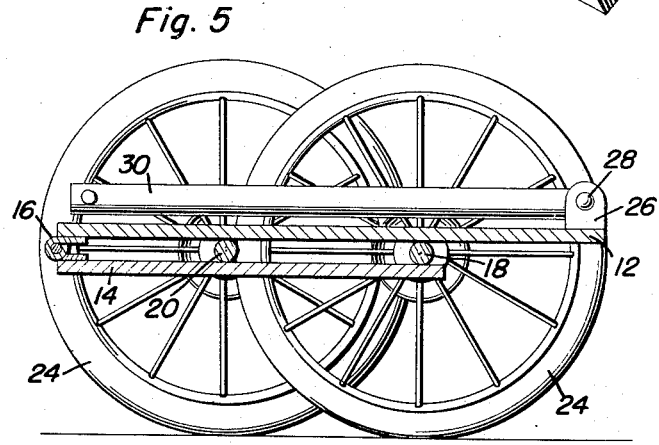
Howard D. East
INVENTOR.

Patented Aug. 14, 1951

2,563,995

UNITED STATES PATENT OFFICE 2,563,995

COLLAPSIBLE WAGON

Howard D. East, Glenolden, Pa.

Application April 10, 1950, Serial No. 155,036

1 Claim. (Cl. 280—36)

This invention relates to new and useful improvements in wagons or wheeled vehicles and the primary object of the present invention is to provide a wagon composed of parts that are quickly and readily folded into a reduced size to permit the wagon to be positioned into a relatively small carrying case.

Another important object of the present invention is to provide a collapsible wagon including a wheeled frame, a sectional enclosure, and novel and improved means for hingeing the enclosure forming sections together and for securing the enclosure to the frame.

A further object of the present invention is to provide a small and compact wagon that is so constructed as to permit the same to be used as a cart for carrying shop or store goods and which is extremely light in weight to facilitate convenient pulling thereof.

A still further aim of the present invention is to provide a wagon that is simple and practical in construction, strong and reliable in use, neat and attractive in appearance, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged detail vertical sectional view taken substantially on the plane of section line 3—3 of Figure 2;

Figure 4 is a perspective view of the present invention folded into a carrying case;

Figure 5 is a sectional view taken substantially on the plane of section line 5—5 of Figure 4, the wagon removed from the case and the enclosure removed; and, Figure 6 is a perspective view of the enclosure forming part of the present wagon.

Figure 1:
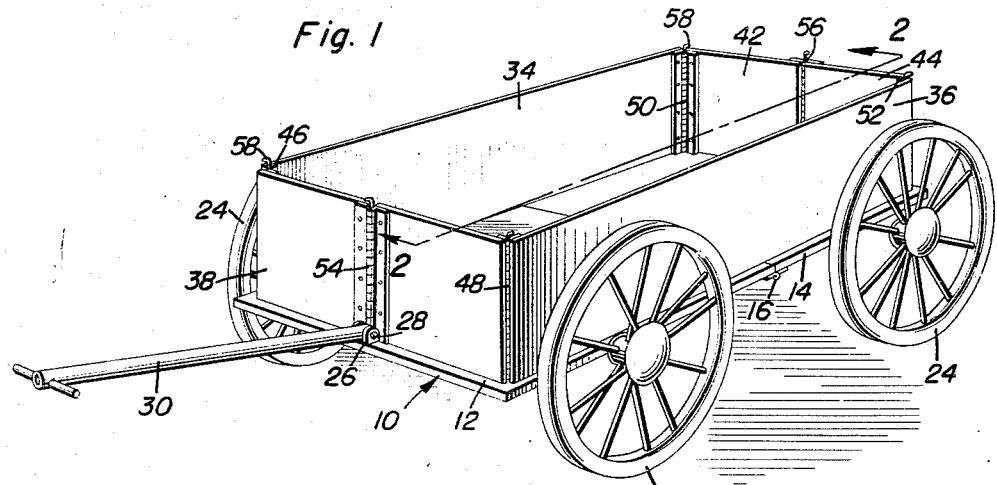
Figure 1 is a perspective view of the present invention assembled for use.
Figure 2:
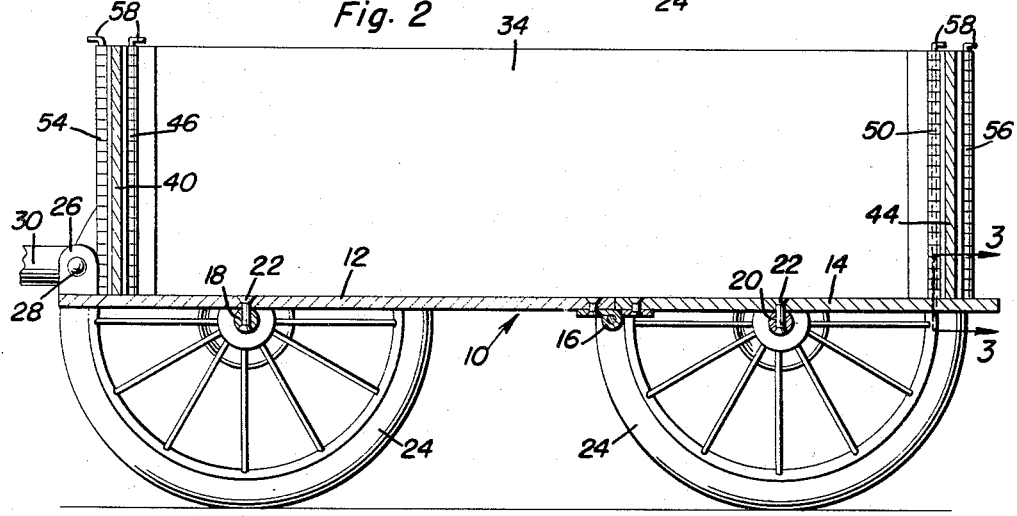
Figure 2 is a longitudinal vertical sectional view taken substantially on the plane of section line 2—2 of Figure 1.
Figure 6:
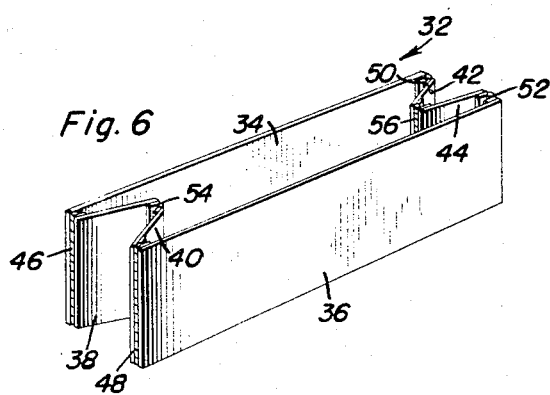

Referring now to the drawings in detail, wherein for the purpose of illustration, there is disclosed a preferred embodiment of the present invention, the numeral 10 represents a wheeled frame composed of a bottom wall having forward and rear substantially rectangular sections 12 and 14. A hinge 16 is secured to the undersurfaces of the sections 12, 14 and joins the inner transverse edges of sections 12, 14. The hinge 16 permits the section 14 to be folded against the lower surface of the section 12.

Forward and rear axles or shafts 18 and 20 are secured to the sections 12 and 14 by rivets 22 or the like. The axles 18 and 20 are spaced parallel to each other and the ends of the axles support wheels 24. The axle 20 is slightly longer than the axle 18 so that the wheels 24 on the axle 20 will be spaced a greater distance from the sides of the bottom wall than the wheels on the axle 18. This construction will permit the section 14 to be folded against the section 12 with the wheels on the forward axle received between the wheels on the rear axle and the side edges of the section 12, as shown in Figures 4 and 5.

A channel bracket 26 is mounted on the upper surface of the section 12 and supports a horizontal pivot 28 that extends through one end of a handle 30. The handle is of such a length as to permit the wagon to be pulled in a convenient manner.

An enclosure 32 is supported upon the bottom wall 12, 14 or the wagon and includes a pair of side walls 34 and 36, a pair of forward end sections 38 and 40, and a pair of rear end sections 42 and 44. Hinges 46 and 48 join the forward end sections 38 and 40 to the forward ends of the side walls 34 and 36. A rear pair of hinges 50 and 52 join the rear end sections to the rear ends of the side walls 34 and 36.

The inner edges of the forward end sections 38 and 40 are joined by a hinge 54 and the rear end sections 42 and 44 are joined by a hinge 56. The hinges 54 and 56 are so arranged as to permit the outer faces of the sections 38 and 40 to be folded against each other and the outer faces of the sections 42 and 44 to also be folded against each other. Also, the hinges 46, 48, 50 and 52 are so arranged as to permit the side walls 34 and 36 to be folded against the inner faces of the end sections 38, 40, 42 and 44.

Each of the hinges 46, 48, 50, 52, 54 and 56 includes complemental interdigitated vertical sleeves that are joined by a hinge pin 58. The lower ends of the hinge pins 58 extend below the lower edges of the end sections and enter openings 60 provided in the sections 12 and 14 to form the sole means for attaching the enclosure to the bottom wall 12, 14 and to retain the enclosure in substantially rectangular form.

Obviously, the lower ends of the pins 58 could be threaded to receivably engage nuts (not shown) that bear against the lower faces of the sections 12 and 14.

When the frame 10 is folded, as shown in Figures 4 and 5, the same will fit into a case 62 having a hinged closure 64. The enclosure 32 will also fit into this case since the case is of a sufficient size to receive the wheeled frame and the enclosure.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described as preferred embodiment of the invention the same is susceptible to certain changes fully comprehended by the spirit of the invention as herein described and the scope of the appended claim.

Having described the invention, what is claimed as new is:

A collapsible wagon comprising a foldable, wheeled frame, and an enclosure removably supported on the frame and including a pair of side walls, a rear pair of end sections, a forward pair of end sections, a forward pair of hinges joining the forward end sections to the side members, a rear pair of hinges joining the rear end sections to the side member, a further hinge joining the forward end sections, and a still further hinge joining the rear end sections, each of the hinges including a vertical hinge pin, said hinge pins constituting the sole means for attaching the enclosure to the frame, and said frame having openings receiving the lower ends of said hinge pins.

HOWARD D. EAST.

REFERENCES CITED

The following references are of record in the file of this patent:

UNITED STATES PATENTS

| Number | Name | Date |
|---|---|---|
| 409,677 | Forman | Aug. 27, 1889 |
| 781,243 | Thompson | Jan. 31, 1905 |